Nov. 17, 1970 R. FUKUTOMI ET AL 3,541,267

COMMON-CONTROLLED AUTOMATIC TELEPHONE EXCHANGE SYSTEM WITH OVERFLOW TRUNKS

Filed April 10, 1967 6 Sheets-Sheet 1

United States Patent Office 3,541,267
Patented Nov. 17, 1970

3,541,267

COMMON-CONTROLLED AUTOMATIC TELEPHONE EXCHANGE SYSTEM WITH OVERFLOW TRUNKS

Reijiro Fukutomi, Kanazawa-shi, Yoshihiro Saito, Shozo Nishimura, and Koji Yamashita, Yokohama-shi, Soichi Inoue, Mikio Iwasaki, and Kazuo Ashihara, Tokyo, Takeshi Kondo, Kawasaki-shi, Sadayuki Hiragi, Kazuo Itoh, and Yoshiaki Hori, Yokohama-shi, and Yukio Ozawa, Hiratsuka-shi, Japan, assignors to Nippon Telegraph & Telephone Public Corporation, Tokyo, Fujitsu Limited, Kawasaki, Oki Electric Industry Co., Ltd., Tokyo, Nippon Electric Company, Limited, Tokyo, and Hitachi, Ltd., Tokyo, Japan Filed Apr. 10, 1967, Ser. No. 629,654
Claims priority, application Japan, Apr. 14, 1966, 41/23,684
Int. Cl. H04q 3/42
U.S. Cl. 179—18 2 Claims

ABSTRACT OF THE DISCLOSURE

The invention pertains to a common-controlled automatic telephone exchange system which includes a number of overflow trunks. Each of the overflow trunks has an inlet connected to a terminal side of a line link frame and an outlet connected to a trunk side of a trunk link frame, and connects the terminal side of the line link frame with the trunk side of the trunk link frame. A market controls the connection of an incoming trunk, via one of the overflow trunks, to a subscriber's station when all the talking channels between the incoming trunk and the subscriber's station are busy.

The present invention relates to improvements in and relating to a common controlled automatic telephone exchange system.

In the conventional automatic telephone exchange system, such as those of multi-stage connected type, having linked talking channels, there arises frequently a considerable drawback which may be termed a kind of internal congestion. In other words, there arises such a disadvantageous operating condition that even when there is a call at the incoming side of a link frame, as well as at least a non-busy outgoing line at the outgoing side of said frame, the call can not be connected to said line on account of an occasional busy condition of all the link lines connecting the incoming and outgoing sides.

Theoretically, it is possible to obviate the internal congestion. For this purpose, however, it is necessary to increase the number of switches to be employed in the telephone exchange system which means naturally a substantial complexity of the whole system and thus a considerable increase of the investment cost. In a practical design, therefore, an allowable limit of internal congestion factor is adopted so as to decrease the number of necessary switching means to a certain allowable limit for the realization of an economical telephone exchange system. As is commonly known, trunk lines are considerably higher in their price than subscriber's lines. For this reason, a larger design factor of the internal congestion is adopted for incoming connections than that for outgoing connections. The internal congestion factor for outgoing telephone exchange is generally denoted $B_{og}$ and may amount to 1/1000 as an example. In the similar way, the internal congestion factor for incoming telephone exchange is commonly denoted $B_{ic}$ and may amount to 2/100 for example. Even when those two congestion factors $B_{og}$ and $B_{ic}$ are given, it is highly difficult to design a link frame arrangement so as to satisfy these factors simultaneously. In most practical cases, the link frame arrangement will satisfy only one of the two and there will be always a considerable superfluity relative to one another.

It is therefore the main object of the present invention to provide a highly improved and economized telephone exchange system comprising at least a link frame arrangement capable of treating a larger volume of traffic even when the overall dimensions be the same.

Another object is to provide a telephone exchange system of the above kind, capable of satisfying the desired values of both kinds of internal congestion simultaneously to a substantial degree.

In the course of an incoming call from another exchange office and with use of the aforementioned kind of automatic telephone exchange system, specific crossbars contained in the incoming and outgoing sides of the link frame, when seen in the calling direction, are kept in their fixed condition. Thus, it is impossible to carry out the desired telephone exchange service when all the links connecting the incoming and outgoing sides of the frame are busy, so far as the said specific crossbar switches are concerned.

A main feature of the present invention resides in the provision of overflow connection means having terminals connected respectively to the incoming and the outgoing side of a link frame arrangement, said means being so designed and arranged that in the case of such an incoming connection where the desired internal connection between the trunk line adapted for the incoming connection and the called subscriber can not be carried into effect through any one of the links provided therebetween, on account of an occasional busy or occupied condition thereof, an overflow connection in place of said regular internal connection is called for through the intermediary of said overflow connection means, thereby providing a possibility for substantially reducing the internal congestion factor or $B_{ic}$ of incoming connection for the link frame.

A further feature of the invention resides in the telephone exchange system so designed and arranged that in the case of the aforementioned overflow connection, the connection between the called subscriber and the overflow connection means is firstly carried out and then the connection between the latter and the incoming connection trunk line means is brought about.

In the telephone exchange system according to this invention comprising a number of subscriber's terminals, a group of switching means including at its one side said terminals, a plurality of incoming trunks electrically connected separately with said switching means at another side thereof, first connection means adapted for electrically connecting said terminals with said incoming trunks, and busy test means for said connection means, the improvement comprises a group of overflow trunk means, second connection means and third connection means, said overflow trunk means being electrically connected with both sides of said switching means group and adapted for making a connection between said trunks and said terminals, when all of said first connection means are busy, said second connection means being provided in said switching means group and adapted for making a connection between said incoming trunk means and said overflow trunk means under the same busy conditions said above, said third connection means being provided again within said switching means group and adapted for making a connection between said terminals and said overflow trunk means.

The foregoing and other objects, features and advantages of the invention will be apparent from the following more particular description of a preferred embodiment of the invention, as illustrated in the accompanying drawings.

Figure 1:
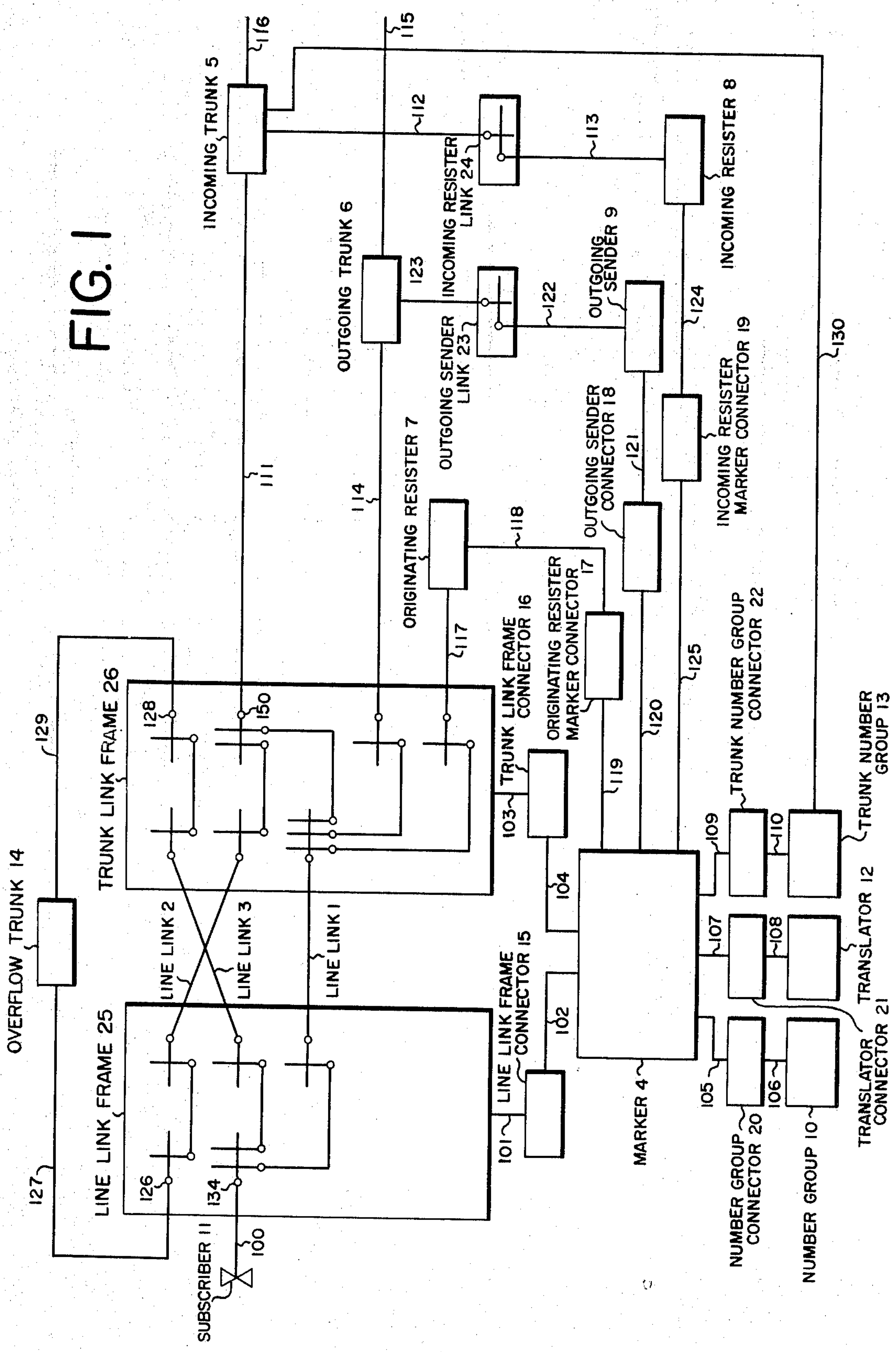
FIG. 1 represents a block diagram illustrative of a preferred embodiment of the invention, comprising a plurality of switching, marker and the like various means and their mutual connections for performing incoming connection as well as outgoing connection.
Figure 2:
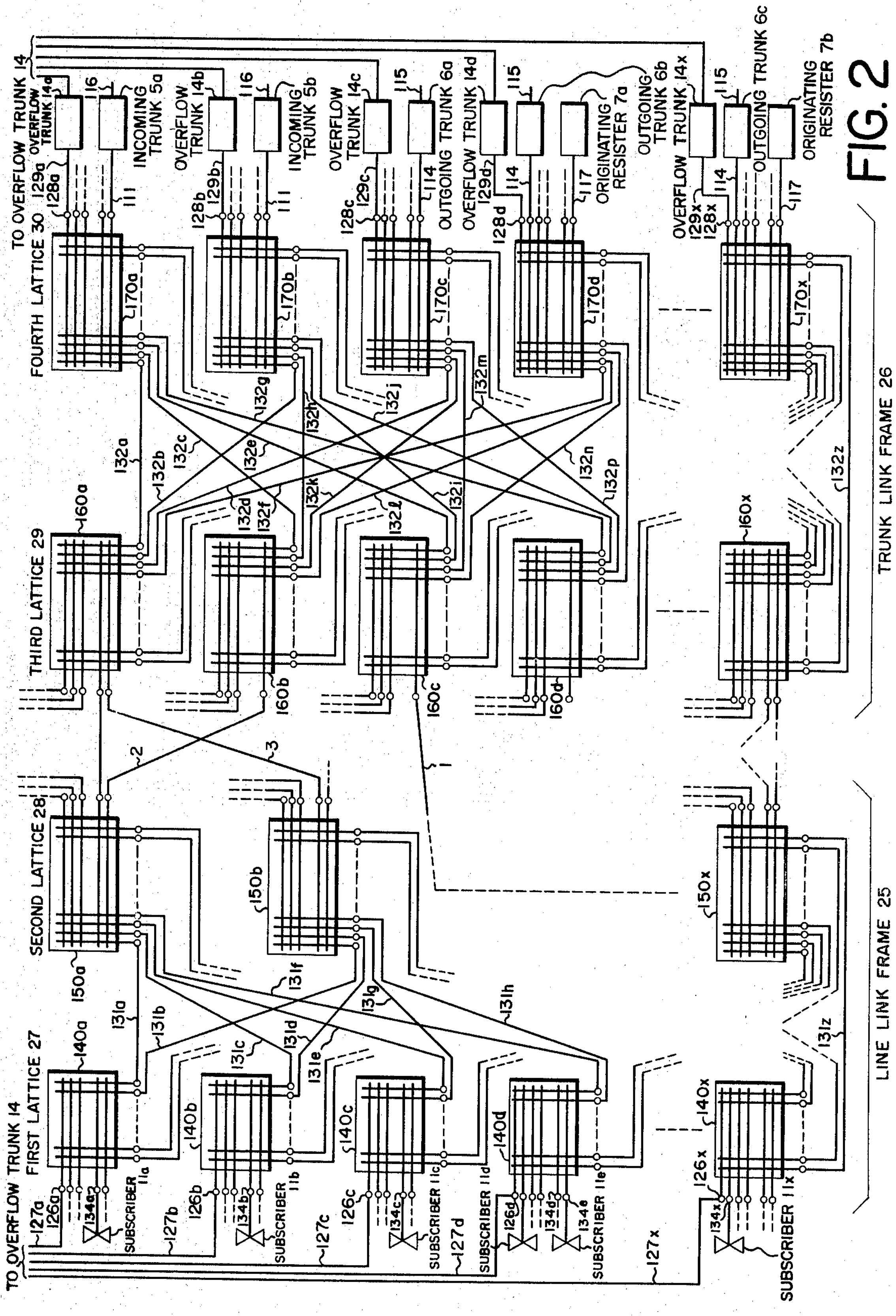
FIG. 2 represents a simplified and partially omitted diagram of a link frame constituting part of the foregoing embodiment shown in FIG. 1, said link frame representing, by way of example, a 4-stage connection link system.

Referring now to the drawings, especially FIGS. 1 and 2 thereof, numeral 25 is a line link frame shown in a simplified form of a block and of a conventional design, preferably comprising a modern crossbar switch arrangement. A more detailed view of this frame 25 is shown at the left-hand side of FIG. 2. Numeral 11 denotes a subscriber's station which is connected through a line 100 to one of subscriber's terminals at 134 of the frame 25, said line being represented schematically in a highly simplified and shortened mode for simplicity of the drawing. In fact, the station 11 represents generally a number of similar subscribers 11*a*, 11*b*, 11*c*, 11*d* . . . 11*x*, as shown in FIG. 2. Terminal 134 is a representative one of those denoted 134*a*, 134*b*, 134*c* . . . 134*x*, again shown in FIG. 2.

Numeral 26 denotes a trunk link frame shown again in a block and of a conventional design similar to line link frame 25. A more detailed view of this trunk link frame is also shown in FIG. 2 at its right-hand side.

Both frames 25 and 26 constitute in combination a link frame arrangement and are interconnected electrically by means of a number of link lines of which those denoted 1, 2 and 3 only are exemplarly represented for convenience in FIG. 1. When necessary, a plurality of such link frame arrangements may be povided in parallel, series or in series-parallel within a telephone exchange office now under consideration.

Block 15 represents a line link frame connector which is electrically interconnected with said frame 25 through a number of lines of which that denoted representatively 101 only is shown. This connector 15 is of conventional design and comprises a plurality of relays and relay contacts, as shown in more detail in FIG. 4.

Block 16 represents a trunk link frame connector which is electrically interconnected with second frame 26 through a number of lines of which that denote representatively 103 only is shown. This connector 16 is of conventional design and comprises a plurality of relays and relay contacts, as shown in more detail in FIG. 4.

Figure 4:
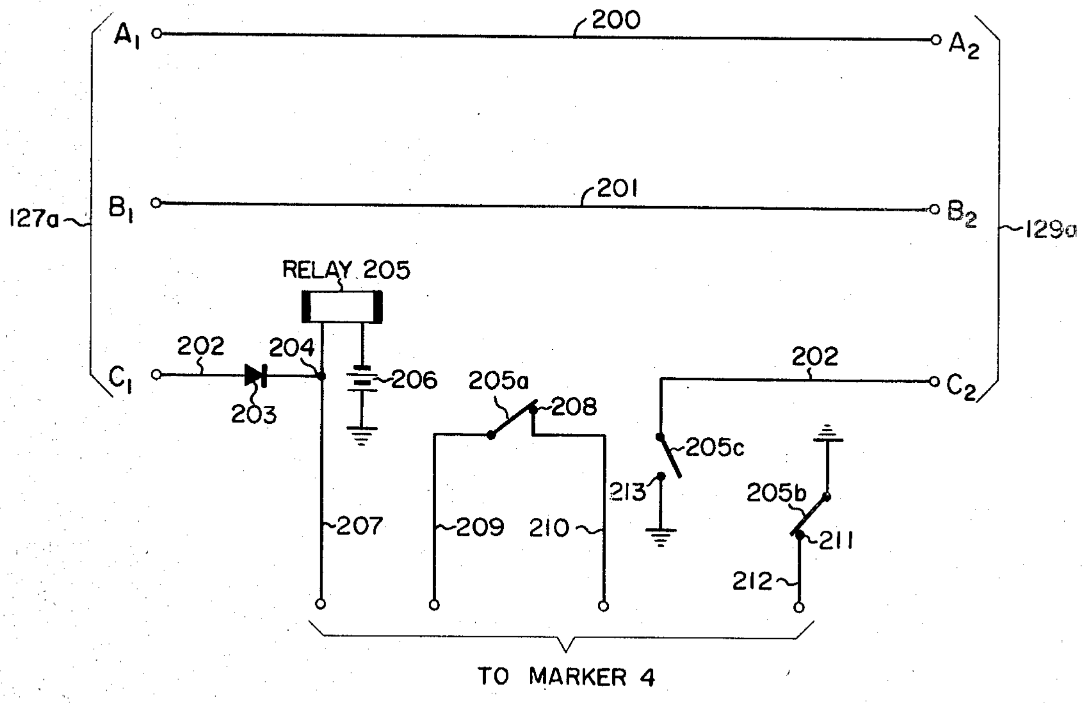
FIG. 4 is a more detailed diagram of the overflow trunk shown in FIG. 1.

Numeral 4 denotes a marker of conventional design comprising a group of relays with relay contacts as more specifically shown again in FIG. 4. This marker 4 is electrically interconnected with the two connectors 15 and 16 each through a number of conductor lines, respectively, of which that denoted 102 or 104 only is shown in as representative mode.

Number group 10 of conventional design and thus shown in a highly simplified manner by a block comprises, generally, relays, relay contacts and resistors, although not shown. This number group serves to convert each incoming call from an other office the called subscriber's number into a specific memory informattion which is to be stored in line link frame 25 electrically connected through conductors 105, a connector 20 and conductors 106 with the number group 10. Conductor groups 105 and 106 are shown each by a single line for simplicity, which applies respectively to conductor groups 107, 108, 109 and 110.

Translator 12 of conventional design and thus shown by a block comprises, generally, relays, relay contacts and resistors, although not shown. This translator 12 serves to convert any outgoing dial number information into a corresponding proper one adapted to be relayed, and is for this purpose electrically interconnected through conductor group 108, a connector 21 and conductor group 107 with marker 4.

Trunk number group 13 of a conventional design comprises again relays, relay contacts and resistors, although not shown, and is adapted for generating each time a specific information representing a sought position of incoming trunk 5 to be specified within the trunk link frame 26, as is conventional, said information being fed to marker 4.

Each of said connectors 20, 21 and 22, of conventional design and thus shown simply by a block, comprises relays and relay contacts and is adapted for functioning in the reversible mode.

Incoming trunk means 5 of conventional design comprises a series of trunks 5*a*, 5*b* . . . each consisting of, although not shown, relays and relay contacts and is adapted for receiving any incoming signal from a separate telephone exchange office through incoming line group 116 and for transmitting the talking signal components through conductor line group 11 to trunk link frame 26 and the control signal components through conductor line group 112, a link 24 of conventional design and conductor line group 113 to incoming register 8 which is again of conventional design. Conductor groups 111, 112 and 113 are shown each by a single line for simplicity of drawing of FIG. 1, yet only the first one 111 being shown in plural in FIG. 2.

Outgoing trunk means 6 of any known design comprises individual trunks 6*a*, 6*b*, 6*c* . . . each consisting of relays and relay contacts, although not shown, and is adapted for receiving each time an outgoing call signal from second frame 26 through conductor line group denoted representatively by a single numeral 114 and for delivery of it through outgoing line group 115, again representatively denoted in the similar way, to a specifically selected exchange office.

Originating register 7 of any conventional design comprises a series of similar registers 7*a*, 7*b* . . . each consisting of relays and relay contacts, although not shown, and is adapted for receiving dialing impulses from a calling subscriber, generally denoted 11, for instance, through trunk link frame 26 and line group, generally denoted 117, and counting and accumulating said impulses and further transmitting the latter through line group 118, connector 17 of conventional design and line group 119 to said marker 4.

Line groups 117–119 are each represented by a single line for simplicity of drawing in FIG. 1.

Outgoing sender 9 which may be of any conventional design and comprises preferably relays, relay contacts and condensers, is adapted for receiving necessary dial impulses from marker 4 through line group 120, connector 18 of known design and line group 121 and for transmitting them further through line group 122, sender link 23 of conventional design and line group 123 to outgoing trunk 6, thence to the neighboring exchange office through trunk line 115. Link 23 comprises a crossbar switch arrangement and serves to detect a nonbusy part of the sender 9, and thus for establishing a necessary connection.

Incoming register 8 may preferably comprise relays and relay contacts and serves for receiving, counting and accumulating dialing information necessary for the one office and further transferring the results to the marker 4 through line group 124, connector 19 of known design and line group 125.

Overflow trunk 14 constitutes the most significant means for carrying out the principles of the invention and may comprise series of overflow trunk elements 14*a*, 14*b* . . . as will be later more specifically noted, each consisting of a relay, three or more relay contacts and a diode, as shown in FIG. 4.

As seen from FIG. 1, the overflow trunk means 14 are connected through line group 127 to a number of one side terminals representatively shown at 126. In the similar way, the same trunk means are connected through line group 129 to a number of other side terminals again representatively shown at 128. First terminal group 126 is arranged at the incoming side of line link frame 25, while second terminal group 128 is positioned at the outgoing side of trunk line frame 26. "Incoming side" and "outgoing side" in this case are referred to, when considering a telephone call from one office to any other office.

In FIG. 1, both line groups 127 and 129 are each shown by a single line for simplicity, although in FIG. 2 said groups are shown in a more practical manner, by 127*a*, 127*b* . . . and 129*a*, 129*b* . . . respectively.

This trunk means 14 functions so that when an incoming call arrives and almost all links such as that denoted 1, for instance, are busy and only a small plurality of links such as denoted 2 and 3, for instance, are not occupied, an overflow connection will establish through the nonoccupied inside links In FIG. 2, first lattice 27 and second lattice 28 comprise each a series of crossbar switches 140*a*, 140*b*, 140*c*, 140*d* . . . 140*x* or 150*a*, 150*b* . . . 150*x*. These two series of switches have their vertical passes interconnected with each other as is conventional by means of connecting links 131*a*, 131*b* . . . 131*z*. In a similar manner, third lattice 29 comprises a series of crossbar switches 160*a*, 160*b* . . . 160*x* and fourth lattice 30 consists of a series of similar switches 170*a*, 170*b* . . . 170*x*. These two series of switches have their vertical passes again interconnected with each other by means of connecting links 132*a*, 132*b* . . . 132*z* as conventionally. Horizontal passes of said second lattice in line link frame 25 are interconnected with those of third lattice 29 in trunk link frame 26 by means of connecting links 1, 2, 3 . . . .

In practice, line group 127 of overflow trunk means 14 comprises conductor lines 127*a*, 127*b* . . . 127*x*, in this case, having terminals 126*a*, 126*b* . . . 126*x*, shown generally in FIG. 1 by 126, which are electrically connected each with one of horizontal passes of respective crossbar switches in the line link frame 25. In a similar way, line group 129 of the same overflow trunk means 14 comprises conductor lines 129*a*, 129*b* . . . 129*x*, in this case, having terminals 128*a*, 128*b* . . . 128*x*, shown generally by 128 in FIG. 1, which are electrically connected each with one of horizontal passes of respective crossbar switches in the trunk link frame 26. Overflow trunk means 14 comprises a series of trunks 14*a*, 14*b* . . . 14*x*, as shown in FIG. 2.

Both frames 25 and 26 are not, naturally, limited to the specific design shown and the manner of link connection between the frames can be modified as occasion may require. The 4-stage link frame shown may also be replaced by a 2- or 3-stage one.

Next, referring to especially FIG. 4, a selected one of overflow trunk elements 14*a*, 14*b*, 14*c* . . . 14*x* shown schematically in FIG. 2 and denoted representatively by 14 in FIG. 1 will be described hereinbelow, since all these elements are of similar design and arrangement with each other, as will be understood from the foregoing.

As an example, the element 14*a* comprises so-called A-line 200 and B-line 201, both being talking lines, and a C-line 202, being a control line, having terminals $A_1$, $A_2$; $B_1$, $B_2$ and $C_1$, $C_2$, respectively. In practice, the line 127*a* comprises three conductor lines connected respectively with terminals $A_1$, $B_1$ and $C_1$, although not specifically shown. In the similar way, the line 129*a* comprises, in practice, three conductor lines which are connected respectively with terminals $A_2$, $B_2$ and $C_2$ although not specifically shown.

Line 202 starting from terminal $C_1$ includes a choking diode 203 and is interrupted, so to speak, at a junction point 204 which is grounded through relay 205, having normally closed relay contacts 205*a* and 205*b* and a normally open relay contact 205*c*, and voltage source 206, on the one hand, and connected through a conductor 207 to marker 4, on the other hand. Relay contact 205*a* cooperates with stationary contacts 208, said contacts being connected to marker 4 through conductors 209 and 210, respectively. Relay contact 205*b* is grounded and adapted to cooperate with a stationary contact 211 which is connected with marker 4 through a conductor 212. Relay contact 205*c* is connected through part of line 202 to terminal $C_2$ and is adapted to cooperate with a stationary contact 213 which is grounded.

Conductor 207 acts as a conventional starting line, while lines 209–210 serve for nonbusy indication for the overflow trunk and line 212 is adapted for group nonbusy indication for the latter.

Further detailed construction of the present telephone exchange system will be given in combination with the functional disclosure of the embodiment, in the following.

In the incoming operation, a call signal delivered from a certain telephone exchange office will arrive through incoming line group 116 at incoming trunk means 5, thereby the latter being seized and incoming register link 24 being actuated through line group 112. By the actuation of the register link, a non-occupied constituent of incoming register 8 is seized through line group 113, thereby an effective connection from incoming trunk 5 to incoming register 8 being established. Then, the selection signal specific to the called subscriber's station 11 and delivered from the calling office is fed from incoming line group 116 through the now established connection passage to the register 8 and stored therein. Upon this store, the incoming register 8 will act effectively through line group 124, connector 19 and line group 125 upon the marker 4. Thus, the latter accepts a specific information to the called subscriber 11, delivered from the incoming register 8. Upon the actuation of the marker 4 under the influence of the energized register 8, the marker will act instantly to seize the trunk number group 13 through line group 109, connector 22 and line group 110. Upon this seizure, marker 4 will deliver a specific signal through a loop passage: 125–19–124–8–113–24–112–5–130 to trunk number group 13 wherein the signal is translated, for the reception of is conventional appearing information of the incoming trunk 5 relative to trunk link frame, as well as a trunk class information necessary for the desired connection.

On the other hand, when the information concerning the subscriber 11 and transferred from the incoming register 8 is ascertained to be that practically directed to any one of selected subscribers belonging to the one office, the marker 4 will instantly seize the number group 10 through line group 105, connector 20 and line group 106, for supplying the called subscriber's information to the number group, which acts to convert the received information into corresponding appearing information of the subscriber, relative to the first frame 25. Then, the thus converted information is fed back to the marker.

Depending upon the appearing information of subscriber 11 relative to first frame 25 and fed from number group 10, and that of incoming trunk 5 relative to second frame 26 and fed from trunk number group 13, marker 4 establishes a talking passage between the trunk 5 and the subscriber 11. For establishing this talking passage, marker 4 will first sense the subscriber 11 depending upon said first information relative to the first frame 25 and then perform a busy test on the called subscriber 11, as usual.

When the subscriber is found to be busy upon such test, marker 4 will perform instantly a busy operation. On the contrary, when the called subscriber is not busy, a conventional busy test means provided in the marker 4 is brought into operation so as to perform a busy test on the link 1 for instance which constitutes the first connection means between the subscriber 11 and incoming trunk 5.

The link busy test is carried out in the following manner (see FIG. 3).

When marker 4 received the appearing information of the called subscriber 11 and that of the incoming trunk 5 from number group 12 and trunk number group 13, respectively, a relay, not shown, which is destined for the called subscriber 11 is energized as is conventional and its contact 89–1 is closed, while a further relay, not shown, destined for incoming trunk 5 is also energized as is conventional so as to close its contact 90–1. In the course of this busy test, marker 4 and the link frame arrangement comprising the two frames 25 and 26 are brought into connection through two connectors 15 and 16.

Upon completion of this connection between marker 4 and link frame arrangement 25, 26, a relay 32 provided in first frame 25 so as to be destined for subscriber 11 is energized through relay contact 89–1, while relay 34 is also actuated through contact 38–1 of relay 38 which is now in its energized condition through relay 42. On the other hand, relay 33 provided in second frame 26 and being destined for incoming trunk 5 is also actuated.

Upon actuation of relays 32–34, a busy test line 135 connected between first lattice 27 having a position destined for the called subscriber 11 which is representative of a large number of subscribers 11*a*, 11*b*, 11*c* . . . 11*x*, by way of example, as already explained hereinbefore, and second lattice 28 (see also FIG. 3); a busy test line 136 for a specific one of the connection links which corresponds to said relay 34, said specific link being one of those denoted 1, 2, 3 . . . which connect second lattice 28 with third lattice 29; and a busy test line 137 for those connecting links 132*a*, 132*b* . . . 132*z* between third lattice 29 and fourth lattice 30 having several positions therein destined for incoming trunk 5, are connected respectively to marker 4. When each of said links is not busy, no signal will be delivered. On the contrary, when they all or any one or more are busy, they represent ground potential. As was already noted, first frame 25 comprises said two lattices 27 and 28, and similarly, second frame 26 comprises said another two lattices 29 and 30.

Figure 3A:
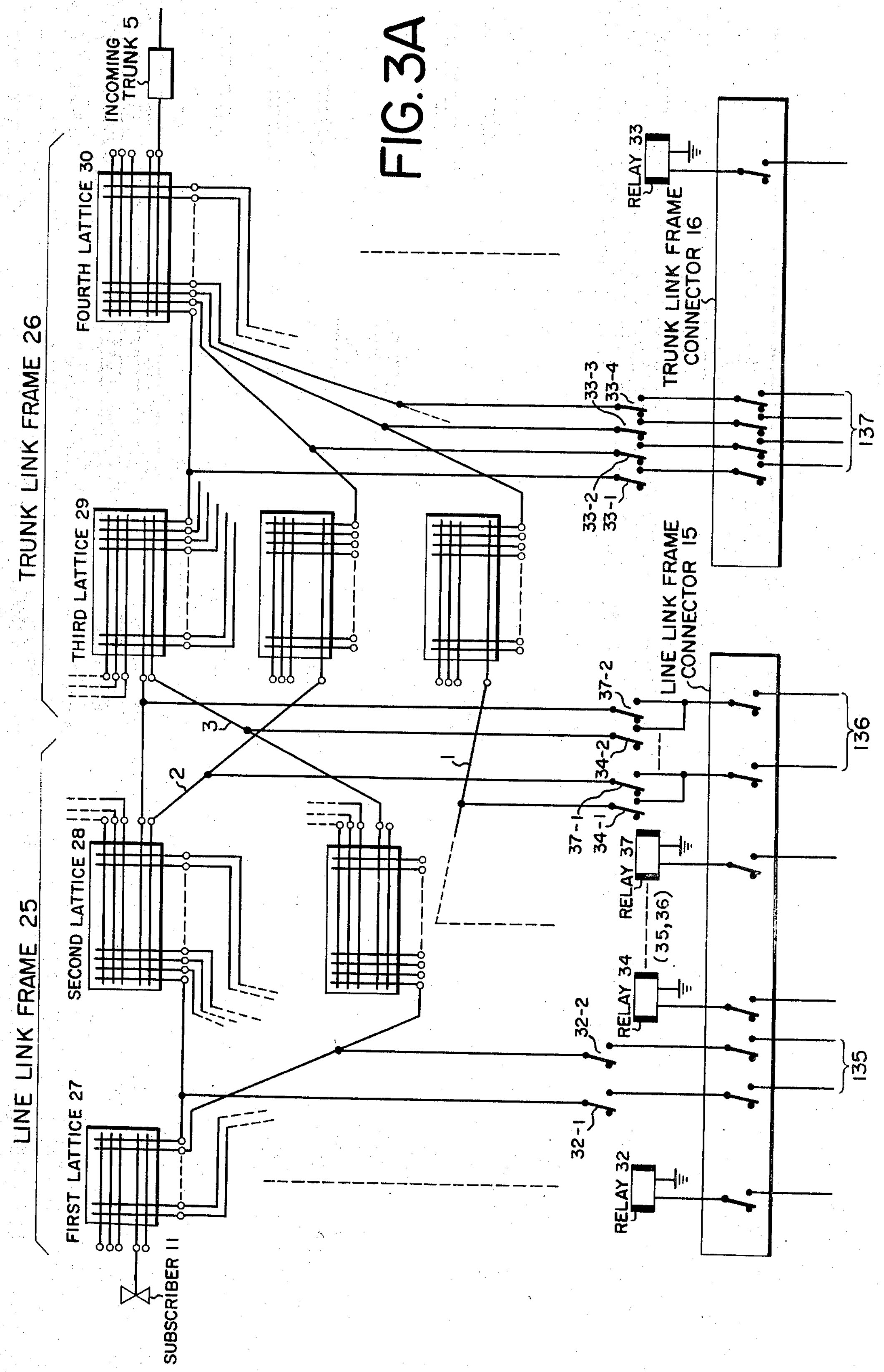
FIGS. 3A and 3B represent, in combination, a wiring diagram of a marker employed, being shown in combination with the link frame means which is shown however in a simplified form.
Figure 3B:
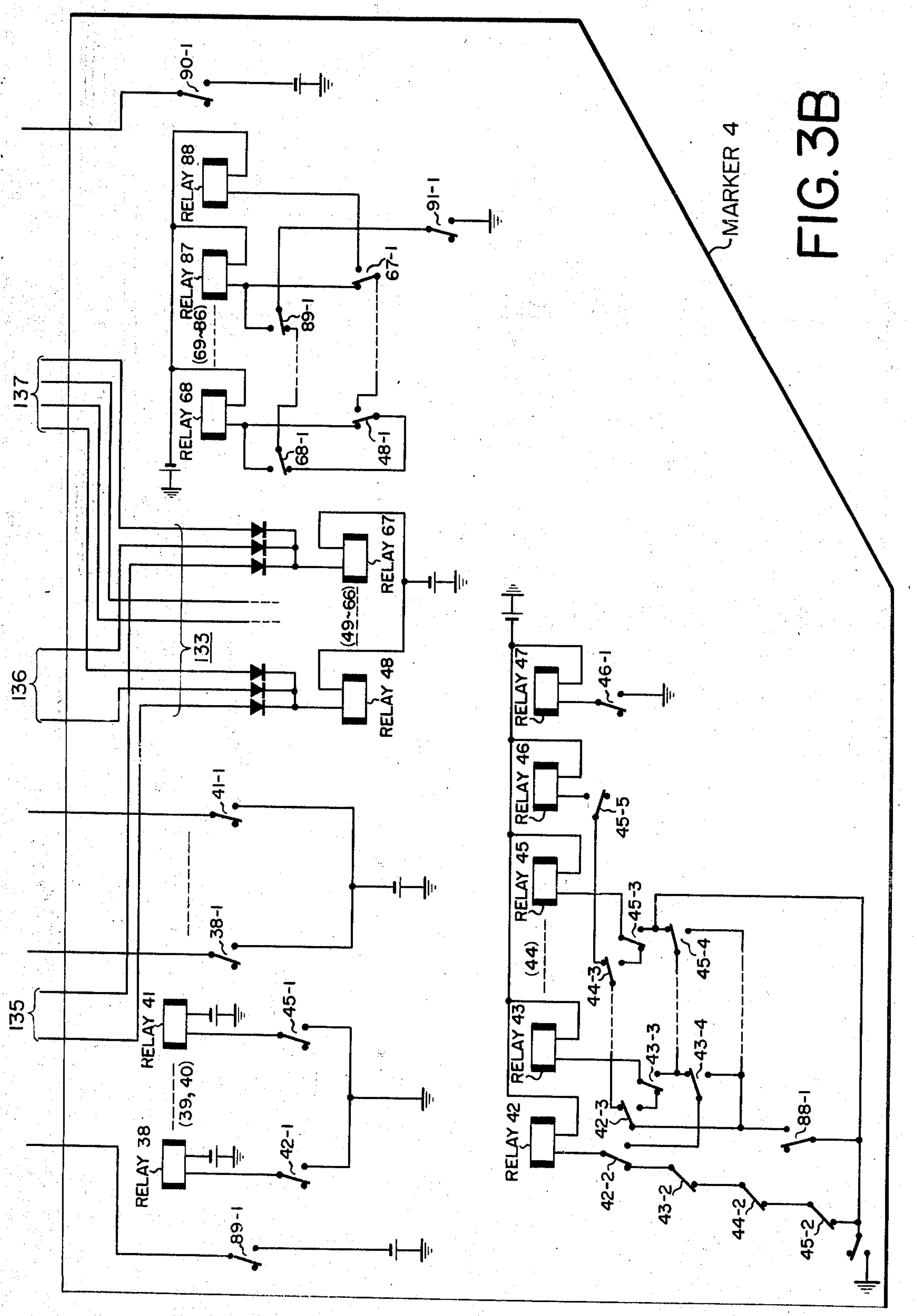

Marker 4 acts to connect each link series comprising one of the links connecting first lattice 27 to second lattice 28, one of the links connecting second lattice 28 and third lattice 29, and one of the links connecting third lattice 29 to fourth lattice 30, to respective relays 48–67 (see FIG. 3). Therefore, if any one of the constituting links of each of said link series be busy or occupied, any specific one of said relays 48–67 will be actuated. One or more of said link series, the corresponding one or more attributed relays 48–67 remain unchanged or more specifically non-actuated, are therefore in their nonbusy conditions.

In other words, after all the test lines for said link series have been connected to respective relays 48–67, the marker actuates, as is conventional, the relay, not shown, of relay contact 91–1. The latter is therefore closed, as described hereinabove, and then some of relays 68–87 corresponding to occasionally non-occupied one or more relays 48–67 actuated through relay contacts 48–1 . . . 67–1 are caused to actuate. In this case, it is to be noted that a kind of preferential circuit is provided for the drive circuit of said relays 68–87 by the combination of relay contacts 48–1 . . . 67–1, and therefore, in this case, the preferenced one of relays 68–87, for instance, that denoted 68, is only actuated and thus the link series related to relay 48 which is arranged in a one-to-one coincidence relation with relay 68 is selected out as a nonbusy link.

When, on the contrary, all the relays 48–67 have been brought into actuation to demonstrate the fact that all the aforementioned link series are fully occupied, all the corresponding relays 68–87 are not caused to actuate, and, instead, relay 88 is actuated.

Upon actuation of relay 88, its contact 88–1 is caused to close for the actuation of relay 43, which is then maintained by relay contact 43–3, while relay 42 is made ready, by means of relay contact 43–4, for restoring upon a restoration of relay 88. This relay 88, which is a kind of time delay relay, will be restored upon elapse of a certain predetermined time period counted from the start of actuation thereof, by the opening of relay contact 91–1.

Upon actuation of relay 43 as mentioned above, one of its contacts, say 43–1, although not shown, is closed so as to actuate a certain relay, say 39, again although not shown, is energized. Relay 38 will be restored, simultaneously with restoration of relay 42.

Upon actuation of relay 39 as above described, one of its contacts, say 39–1, although not shown, is closed and a certain relay, say 35, again although not shown, which is arranged within line link frame 25, is caused to actuate (relay 35 is arranged to restore simultaneously with a restoration of relay 38).

Upon actuation of relay 35, the busy test line 136 for a certain selected one of connecting links 1, 2, 3 . . . between second lattice 28 and third lattice 29 which corresponds to relay 37 is connected with the marker 4. Since, in the similar manner as before, the busy test lines 135 attributed to connecting links 131*a* . . . 131*z* between first lattice 27 and second lattice 28 and those 137 for connecting links between third and fourth lattices 29, 30 have been kept in connection with marker 4, a plurality of link series, each comprising said three kinds of links, are connected with respective relays 48–67.

At this stage, similar busy tests for connecting links are carried into effect relying upon the operation of relay groups 48–67 and 68–87 as before. When it is ascertained by these busy tests that all the related links are fully occupied and thus none of relays 68–87 is caused to actuate, relay 88 is then brought into actuation so as to energize relay 44, and so on, until a nonbusy link is found out.

Even when these recycled busy tests have been completed and no un-occupied link has been sensed, relay 46 of marker 4 provided for identifying the recycled busy test operation is caused to operate for closing its contact 46–1. Upon closure of this relay contact 46–1, overflow connection indicator relay 47 is actuated, so as to initiate an overflow connection through overflow trunk 14, as will be described hereinafter more in detail.

In order to carry out busy tests for the links 1, 2, 3 . . . provided between line link frame 25 and trunk link frame 26, it is sufficient to make the test on the specific line link 1, because, at the outgoing side or first frame 25 of the link frame as a whole the appearing position of the called subscriber as at 11 is predeterminedly fixed, and at the incoming side or second frame 26 of the link frame arrangement, those of the constituting elements of incoming trunk means 5 are also fixed. When the line link 1 is sensed to be nonbusy in the course of the said busy test, marker 4 will act to connect the called subscriber 11 and the incoming trunk 5 through the nonbusy line link 1, and thus the desired incoming connection is carried about therethrough. On the contrary, if the line link 1 is found busy on account of the internal congestion in the incoming direction, it would be impossible in the case of a conventional comparative arrangement fitted with none of the overflow trunk means to establish a desirous connection between the called subscriber and the incoming trunk 5 and therefore a busy operation must be called for.

With use of the novel arrangement as proposed by the present invention so far described, however, the marker 4 does not perform a busy operation as above referred to. It will initiate, in place of the busy operation, an incoming overflow connection via any suitable one of the elements constituting the overflow trunk 14 provided therefor.

If it is impossible to establish a connection between the called subscriber 11 and one of the terminals, at 128, of the overflow trunk 14 positioned within trunk line frame 26, on account of busy conditions of all the links 3 for instance, or the third connection means provided along talking channels between subscriber 11 and terminals 128, the marker 4 seizes a different element of overflow trunk 14 and operates to establish a talking channel through this newly selected overflow trunk element, and so on, until the last overflow trunk element will have been tested. Even when a predetermined number or recycle operations relative to all the overflow trunk elements have been completed and nevertheless no effective connection between called subscriber 11 and overflow trunk 14 can not be established, the marker 4 will initiate finally a busy operation.

When a connection of the called subscriber 11 with one of the terminals 128 of overflow trunk 14 provided at trunk link frame 26 has been established in the aforementioned way, the marker will function to try to connect incoming trunk 5 with one of terminals 126 of overflow trunk 14 provided at line link frame 25. In this case, however, no recycle operation is performed, or more specifically, if all the second connection means, which are links 2 in this case, lying along talking channels between incoming trunk 5 and terminals 126 of overflow trunk 14 provided at line link frame 25 are busy, marker 4 will initiate a busy operation. On the contrary, if there is a non-busy link 2, marker 4 functions to connect one of terminals 150, only one being shown as representative, for incoming trunk 5 through link 2 to terminal 126. Therefore, the incoming trunk 5 and the called subscriber 11 are connected by way of a route 5–111–150–2–126–127–14–129–128–3–134–100–11.

When the corresponding overflow trunk element **14*a*, for instance, has been subjected to an idle selection through conductors 209, 210 and 212 from marker 4, a certain potential is given therefrom to conductor 207 as is conventional for the initiation of start of the trunk element, resulting in relay 205 being energized. Upon the energization of relay 205, its contact 205*a* is separated from engagement with mating contact 208 for putting conductors 209–210 into busy-representing conditions. At the same time, relay contact 205*b* is opened from contact with stationary contact 211 and the conductor 212 is brought into busy-representing condition, as is conventional. On the contrary, relay contact 205*c* is closed and thus ground potential will appear at the terminal $C_2$ of the C-line 202, thereby the called subscriber 11** being kept in its holding condition through the action of the link frame.

On the other hand, upon completion of the incoming trunk 5 with the overflow trunk element, ground potential will appear from the trunk 5 through the link frame at the opposite terminal $C_1$ of the C- or control line 202, thereby the already energized relay 205 being kept in its holding condition.

Briefly concluded, when the incoming trunk 5 is connected effectively with the called subscriber 11, the relay 205 of the overflow trunk element, for instance, at **14*a*, is kept in a hold condition under the influence of ground potential fed through part of the C-line from incoming trunk 5 and the occasionally connected link with the called subscriber 11 is also kept in a hold condition by the grounded relay contact 205*c* which is now closed upon the energization of relay 205, for providing ground potential to the remaining part of the C-line 202**.

Next, the outgoing connection will be described by way of example hereinbelow:

In this case, the calling subscriber's station as at 11 is first connected with originating register 7 as is conventional by the way of a dial tone connection. Then, originating register 7 will receive the information of a called subscriber's number transmitted from the calling subscriber 11.

Upon the reception of the said information, the originating register 7 seizes marker 4 through conductor group 118, connector 17 and conductor group 119 and transmits the called number information, as well as appearing information of the calling subscriber within line link frame 25, to the seized marker 4 which will then seize translator 12 through line group 107, connector 21 and line group 107, connector 21 and line group 108, for feeding said informations.

The outgoing connection mode of the present exchange system is substantially similar to a conventional one. In the following, however, the outgoing mode will be described briefly. In this case, the calling subscriber is denoted again by 11 for simplicity of description.

At first, the calling subscriber 11 is connected with the originating register 7 relying upon the conventional dial tone connection means, and then the register 7 receives the called subscriber's number information furnished by the calling subscriber 11.

Upon reception of the number information, originating register 7 will seize marker 4 through connector 17, thereby transferring the called subscriber's number information, the appearing information of the calling subscriber 11 at line link frame 25, and the like, to the marker which acts then to seize the translator 12 through connector 21 for retransfer of the received information to said translator.

Translator 12 identifies the occasional class of the calling subscriber 11 depending upon the first information thus fed, senses the outgoing connection depending upon the second information thus fed, and delivers a trunk block information identifying an idle channel, if any, within outgoing trunk to marker 4. Then, the marker seizes the indentified idle outgoing channel and performs a busy test on connection links 1 lying along the talking channel connecting the idle trunk 6 and the calling subscriber 11. If there is an idle link 1, a connection is made between the two above specified. On the contrary, when all the links are busy, marker 4 will seize a further idle trunk channel 16 and a similar busy test is made, and so on. Even upon recycling the above procedure, there may be no idle link 1 and thus it is impossible to establish a connection between the calling subscriber 11 and the outgoing trunk 6, and then marker 4 will function to initiate a busy operation.

When an idle link 1 is ascertained to exist in the course of the aforementioned recycling operation, marker 4 acts to connect the calling subscriber through the intermediary of such idle link 1 with the outgoing trunk 6. It seizes then an outgoing sender 9 corresponding to the selected and seized trunk 6 through line group 120, connector 18 and line group 121 and connects the sender 9 through line group 122, sender link 23 and line group 123 to outgoing trunk 6. Then, the marker 4 transmits the dial information from the subscriber 11 through the thus established conductive passage including the outgoing sender 9, the outgoing trunk 6 and outgoing line group 115 to a called telephone exchange office, thence to a called subscriber in this case.

Figures 5, 6, 7:
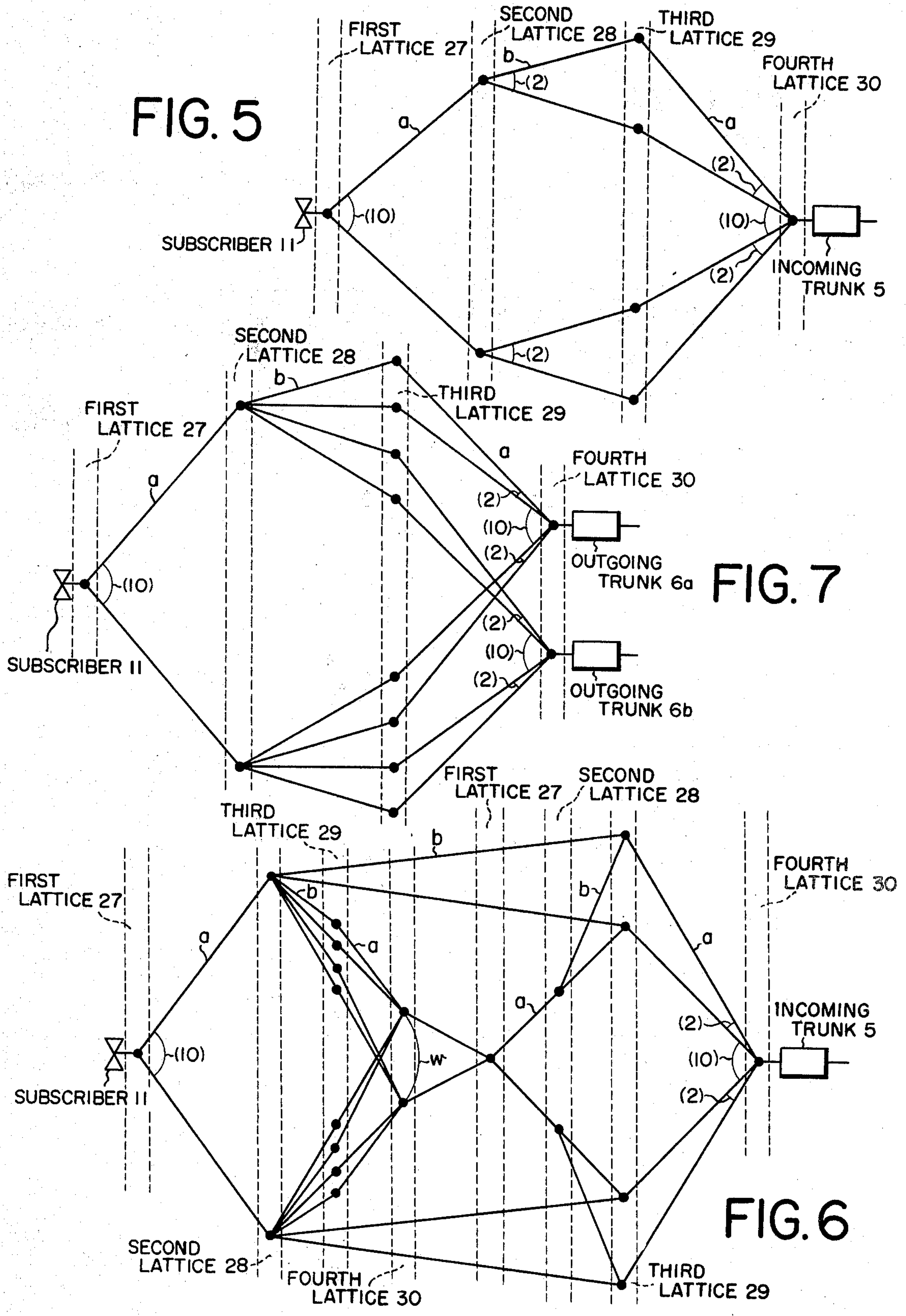
FIG. 5 is an explanatory schematic view, illustrative of a regular incoming connection mode with use of the foregoing 4-stage connection link system shown in FIG. 2, yet without utilization of an overflow trunk shown in FIG. 1.
FIG. 6 is a similar view of FIG. 5, wherein however the overflow trunk is utilized.
FIG. 7 is a simplified explanatory view, illustrative of an outgoing connection mode with use of said 4-stage connection link system.

Now considering the traffic calculation on the 4-stage link frame as shown in FIG. 2, it is first assumed that the connection between the incoming trunk 5 and the called subscriber 11 has been carried into effect without use of overflow trunk means 14, yet relying solely on one of the regular inside talking channels including, for instance, connecting link 1. In this case, the connection mode may be represented schematically as shown in FIG. 5. In this figure, small black circles represent crossbar switches belonging to respective lattices 27–30 shown in FIG. 2. It is observed from FIG. 5 that a specific crossbar switch contained in the first lattice 27 corresponds to the called subscriber 11 and a specific crossbar switch in the fourth lattice 30 corresponds to the incoming trunk 5. Several full lines connecting between the both extremities represent possible inside link series or talking passages.

In this case, it is assumed that $a$ denotes the mean busy coefficient relative to the first links connecting between first lattice 27 and second lattice 28; $b$ the similar coefficient relative to the second links or junctors connecting between second lattice 28 and the third lattice 29; and $a$ that relative to the third links connecting between the third lattice 29 and the fourth lattice 30.

It is further assumed that the internal congestion $B_{1c}$ of the connection shown schematically in FIG. 5 be of the nature of a binominal distribution. Then, we obtain:

$$B_{1c}=[a+(1-a)\{b+(1-b)a\}^2]^{10}$$

When all of the links 1 are busy and the aforementioned unique mode of connection between the incoming trunk 5 and the called subscriber 11 is carried into effect through the intermediary of overflow trunk 14, for instance via such a connecting loop: 5–2–14–3–11, it is assumed that for the connection of the subscriber 11 and the terminals 134 of the overflow trunk 14 at the side of trunk link frame 26 there may be $(w-1)$ times of recycle. Then, a connection as shown schematically in FIG. 6 can be obtained. In this figure, as in the case of FIG. 5, small black circles represent crossbar switches belonging to specific lattices as shown, and full lines are link series or possible talking channels connecting between a specific crossbar switch contained in the fourth lattice 30 and destined for incoming trunk 5 and a separate specific crossbar switch contained in the first lattice 27 and destined for the called subscriber. In FIG. 6, connecting link series including overflow trunk 14 are also included. The left-hand half of this figure including 4-staged lattices include connecting links 3 which were shown representatively in FIG. 1, while the right-hand half of FIG. 6 including the remaining 4-staged lattices comprises connecting links 2 which were shown again representatively in FIG. 1. At the centre of FIG. 6, two connecting links are shown by way of example which connect two crossbar switches belonging to the fourth lattice 30 with a specific crossbar switch belonging to the first lattice and thus corresponds to the overflow trunk 14. Generally, speaking these talking channel parts or overflow trunk 14 connect the first lattice 27 belonging to line link frame 25 with the fourth lattice 30 belonging to trunk line frame 26. There are shown upper two and lower two link series or talking channel parts which do not include the overflow trunk 14 as in the case of those shown in FIG. 5.

When calculating the internal congestion factor $B'_{1c}$:

$$B'_{1c}=\sum_{k=0}^{w-1}T_k\cdot P_k+\left(1-\sum_{k=0}^{w=1}T_k\right)P_w$$

where

- $P_k$ denotes nonconnection probability between a specific incoming trunk and a specific subscriber, with the existence of $k$-overflow trunk passages;
- $T_k$ denotes probability for such busy conditions that all of $k$=overflow trunk passages are occupied.
- $P_w$ denotes nonconnection probability between the specific incoming trunk and the specific subscriber, with the existence of $w$=overflow trunk passages;

Further $$P_k=\sum_{r=0}^{10}\binom{10}{r}a^{(10-r)}\cdot(1-a)^r\cdot\sum_{l_1=0}^{r}\cdot$$

$$\sum_{S_1=0}^{r-l_1}\binom{r}{l_1}\binom{r-l_1}{S_1}(1-a)^{2l_1}x\{2a(1-a)\{^{S_1}\cdot\}a^2\{^{(r=l_1-S_1)}\cdot$$

$$\sum_{l_2=0}^{10-r}\cdot\sum_{S_2=0}^{10-r-l_2}\binom{10-r}{2}\binom{10-r-l_2}{S_2}x(1-a)^{2l_2}\{_{2a(1-a}\}^{S_2}\cdot$$

$$\{a^2\}^{(10-r-l_2-S_2)}\cdot b^{(2l_1+S_1)}x\{B_1+(1-B)B_2{}^k\}$$

where

- $r$ denotes number of idle first links available to the specific subscriber; $l_1$ denotes number of idle talking channels including *r-idle* first links and corresponding third links;
- $S_1$ denotes number of either idle links among $r$-idle first links and corresponding third links;
- $l_2$ denotes number of idle talking channels including $r$-idle first links and non-corresponding or remaining third links;
- $S_2$ denotes number of either idle links among $r$-idle first links and noncorresponding or remaining third links;
- $k$ denotes number of idle overflow trunk passages.

and where, $$B_1=\{a+(1-a)b^2\}^{(l_1+l_2)}\cdot\{a+(1-a)b\}^{(S_1+S_2)}$$

$$B_2=\{b+(1-b)a\}^{2r}$$

$$T_k=\frac{A^{(x-k}}{(x-k)!}\Big/\sum_{i=0}^{X}\frac{A^i}{i!}$$

$x$ denotes the overall number of overflow trunk passages; and A represents the overall traffic capacity through overflow trunk passages.

Next, we consider the outgoing connection with use of the 4 stage link frame arrangement shown in FIG. 2, under such assumption that $(w-1)$ recycles be allowed. Then, a connection as shown schematically in FIG. 7 may be obtained. Also in this diagram, small black circles denote crossbar switches of which the most right-hand one is represented by those contained in the fourth lattice 30 belonging to trunk link frame 26, and destined for outgoing trunk passages **6*a* and 6*b*, representing those which are $w$ in its number. In this case, therefore, the recycles may be performed $(w-1)$ times, at the maximum, for trying the desired outgoing connection from the calling subscriber, at 11 in this case, with $w$-outgoing trunk passages, generally denoted by 6 in FIG. 1. As in the foregoing, full lines connecting small black circles are indicative of possible connecting or talking channels from the specific crossbar contained in the first lattice and destined for the specific calling subscriber, as at 11 in this case shown in FIG. 7, to $w$-crossbar switches contained in the fourth lattice and destined for $w$-outgoing trunk passages 6*a*, 6*b* . . . 6*w***.

In FIGS. 5–7, numerals such as (2), (10) and the like represent respective outgoing links or conductors.

From the foregoing, the internal congestion $B_{og}$ for the connection shown in FIG. 7 may be expressed.

$$B_{og}=[a+(1-a)\{b+(1-b)a\}^{2w}]^{10}$$

Figure 8:
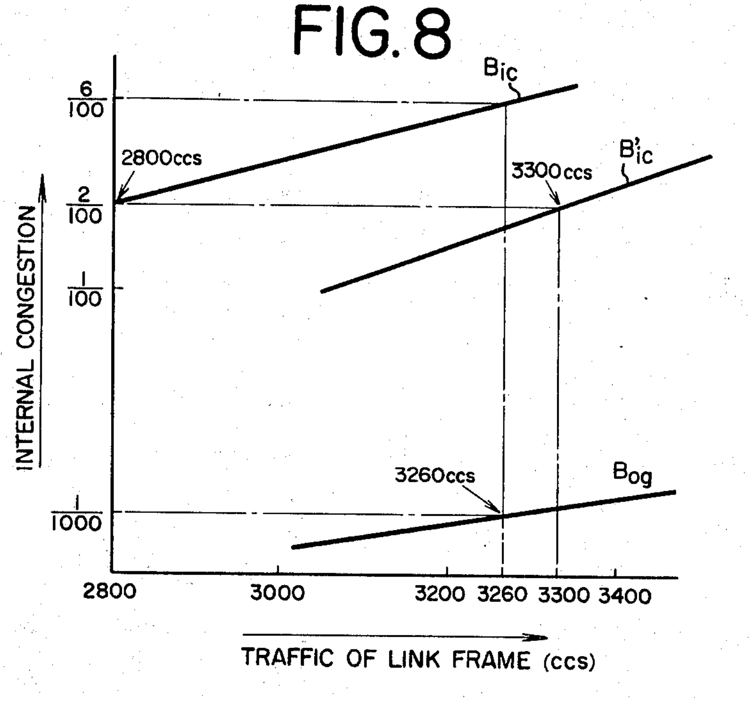
FIG. 8 is a diagram of internal congestion plotted against traffic of a link frame, the data having been taken from the system shown in FIGS. 5, 6 and 7.

In FIG. 8, a diagram illustrative of internal congestions $B_{1c}$, $B'_{1c}$ and $B_{og}$ plotted against traffic, ccs. of the link frame arrangement fitted with overflow trunk means, being shown in FIGS. 1–4. In this case, however, $w$ is assumed to be 5. Further, for the calculation of $B_{1c}$, with use of the overflow trunk passages the latter are assumed to be a proper value at an assumed earlang loss factor: 1/10 when calculated with the conventional earlang loss formula.

From FIG. 8, it is clear that in the case of incoming connection and for satisfying of $B_{1c}$ or $B'_{1c}$ to be 2/100, the traffic capacity per link frame arrangement becomes 2800 or 3300 ccs. respectively. On the other hand, the similar traffic capacity in the case of outgoing connection will become 3260 ccs. for satisfying the internal congestion $B_{og}$ to be 1/1000.

It will be further clear that without use of the overflow trunk 14 and with use of solely internal line links such as 1, the traffic becomes 2800 ccs. when considering that $B_{1c}$ and $B_{og}$ being 2/100 and 1/1000, respectively. On the other hand, the traffic capacity of the frame arrangement shown in FIG. 1, when considered with the provision of overflow trunk 14, in combination with use of specific line links such as 2 and 3 will be increased to as high as 3260 ccs., by taking $B_{1c}$:2/100 and $B_{og}$:1/1000 into account.

Taking such possible worst operating conditions for incoming connections with use of overflow trunk 14 that the traffic capacity of the latter be directed solely for the incoming service and be 200 ccs. from the following assumed relation:

$$3260 \text{ ccs.} \times 6/100 \cong 200 \text{ ccs.}$$

the difference in traffic capacity between the solely internal service and the overflow trunk service will be:

$$3260 \text{ ccs.} - 200 \text{ ccs.} = 3060 \text{ ccs.}$$

This value of 3060 ccs. represents a minimum gain with the provision of the overflow trunk 14. Therefore, it is clear that with the provision of the overflow trunk, the traffic performance of the telephone exchange system for incoming connection service can be substantially increased.

Finally turning back to FIGS. 1 and 4, the marker 4 is so designed and arranged that in the case of incoming connection with use of overflow trunk 14 between incoming trunk 5 and the called subscriber such as 11, a connection between the terminal 134 of the latter and the terminal 128 of overflow trunk 14 at trunk link frame 26 is made first, and then a connection between the terminal 150 for incoming trunk 5 and the terminal 126 of overflow trunk 14 at line link frame 25, is called for, because in this case the marker 4 can act through a single operation to connect the called subscriber 11 and the incoming trunk 5. By beginning with the connection of the called subscriber with the overflow trunk, it is not necessary to seize twice the number group 10 thus obviating an otherwise necessary longer access time. In addition, when the marker obtains the appearing information of the overflow trunk by means of conventional selection means contained in the marker, the latter acts so that at first it is furnished with the outgoing terminal information for making its related connection and then the marker obtains the incoming terminal information from the selection means for performing the related connection. Therefore, in this case, the operating mode can be deemed as equivalent to the conventional connection mode relying solely upon the internal frame arrangement.

In the course of performing the necessary connection in this case, the holding of the called subscriber, or more specifically, C-line 202 shown in FIG. 4, can not be made from the side of incoming trunk 5, but, should be performed from the overflow trunk 14. For this purpose, the line 202 is interrupted at such place where the contacts 205*a* and 208 are provided in FIG. 4. Such division of the control line 202 into two line elements, as was already referred to, will further increase the advantage which is obtainable with use of the overflow trunk 14.

A preferred embodiment of this invention has been described in the foregoing specification and illustrated in the drawings, but it is specifically contemplated that modifications thereof and additions thereto will be obvious to those skilled in the art and such modifications and additions are specifically contemplated to be a part of this invention, the scope of which is limited only as defined in the appended claims.

What is claimed is:

1. A common-controlled automatic telephone exchange system comprising:

a line link frame comprising a number of crossbar switches, a trunk link frame comprising a number of crossbar switches, a plurality of line links coupling a first side of said line link frame to a first side of said trunk link frame, a plurality of subscriber's stations coupled to a second side of said line link frame, said second side being termed the terminal side, a plurality of incoming trunks coupled to a second side of said trunk link frame, said second side of said trunk line frame being termed the trunk side, a plurality of overflow trunks, each of which has an inlet coupled to said terminal side of said line link frame and an outlet coupled to said trunk side of said trunk link frame, whereby each of said overflow trunks connects said terminal side of said line link frame to said trunk side of said trunk link frame, and a marker for connecting one of said incoming trunks, via one of said overflow trunks, to one of said subscriber's stations, when all of the talking channels connected between one of said subscriber's stations and one of said incoming trunks are busy.

2. A telephone exchange system as set forth in claim 1, wherein each of said overflow trunks comprises, a plurality of talking lines, a control line divided into two interrupted parts, one part of said control line being allocated to said terminal side of said line link frame and said other part of said control line being allocated to said trunk side of said trunk link frame, and a relay coupled to said part of said control line allocated to said terminal side of said line link frame and having a relay contact connected to said other part of said control line allocated to said trunk side of said trunk link frame.

No references cited.

WILLIAM C. COOPER, Primary Examiner